United States Patent [19]

Tsuno et al.

[11] Patent Number: 5,206,331
[45] Date of Patent: Apr. 27, 1993

[54] SEALANT COMPOSITION COMPRISING MOISTURE CURABLE ISOCYANURATE CONTAINING COMPOUND

[75] Inventors: Shingo Tsuno, Sakai; Ryuichi Ueda, Ikeda; Masahiro Ito, Shimamoto, all of Japan

[73] Assignee: Sunstar Engineering, Inc., Osaka, Japan

[21] Appl. No.: 714,844

[22] Filed: Jun. 13, 1991

[30] Foreign Application Priority Data

Jun. 15, 1990 [JP] Japan ................................. 2-158261

[51] Int. Cl.⁵ ............................................ C08G 18/18
[52] U.S. Cl. .......................................... 528/52; 528/48; 528/49; 528/50; 528/51; 528/53; 528/54; 528/55; 528/56; 528/57; 528/58; 528/59; 528/905; 525/452
[58] Field of Search ....................... 528/48, 49, 50, 51, 528/52, 53, 54, 55, 56, 57, 58, 59, 905; 525/452

[56] References Cited

U.S. PATENT DOCUMENTS 3,786,030  1/1974  Rice ........................................ 528/59
4,880,845  11/1989  Moss et al. ............................ 528/53

Primary Examiner—Maurice J. Welsh
Assistant Examiner—Rachel Johnson
Attorney, Agent, or Firm—Wegner, Cantor, Mueller & Player

[57] ABSTRACT

At least some of the isocyanate groups in the cured polyurethane sealant of this invention have the isocyanurate structure. A moisture-curing sealant composition of the invention comprises an active isocyanato-terminated isocyanate prepolymer containing a polyol component with a molecular weight of 2,000 to 20,000 and an isocyanurating agent. The sealant composition of the present invention is particularly excellent in initial bond strength due to sharp viscosity buildup.

8 Claims, No Drawings

SEALANT COMPOSITION COMPRISING MOISTURE CURABLE ISOCYANURATE CONTAINING COMPOUND

FIELD OF THE INVENTION

The present invention relates to a polyurethane sealant and more particularly to a sealant for windshields of automobiles and other motor vehicles or for architectural use.

BACKGROUND OF THE INVENTION

A one-package polyurethane sealant composition comprising an isocyanato-terminated isocyanate prepolymer containing a polyester polyol or polyether polyol component cures as it forms a urea bond chiefly on reaction with the water (moisture) present in the atmosphere. Just because it cures in the presence of moisture, such a one-package sealant composition suffers a considerable reduction in the reaction rate under low-temperature, low-humidity conditions.

To overcome this disadvantage, one-package heat-curable urethane adhesives and paints which cure on thermal dissociation have heretofore been made available by way of blocking the isocyanate or the polyol component.

Thermally curable polyurethane adhesives and paints based on temperature-sensitive amine or polyol curing agents as well as hot-melt type one-package polyurethane sealants have also been proposed.

However, such polyurethane sealant compositions are low in the rate of curing reaction particularly in the low-temperature, low-humidity environment so that they tend to sag (flow) or be deformed by vibrations or the like. In the case of a heat-curing sealant, heating at a high temperature is required.

SUMMARY OF THE INVENTION

The object of the present invention is to provide a curable polyurethane sealant composition which undergoes a sharp viscosity increase particularly under heating at 60° to 160° C. to achieve a desired degree of initial bond strength.

The present invention provides a cured sealant characterized in that at least some of the isocyanate groups in the cured polyurethane have the isocyanurate structure or the dimer structure.

The present invention further provides a one-package or two-package moisture-curing sealant composition which yields said cured polyurethane sealant.

This sealant composition is characterized by containing an active isocyanato-terminated isocyanate prepolymer containing a polyol component with a molecular weight of 2,000 to 20,000 and an isocyanurating catalyst.

DETAILED DESCRIPTION OF THE INVENTION

Thus, as illustrated by the following schema,

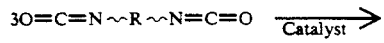

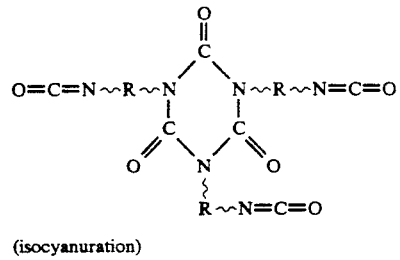

(isocyanuration)

or

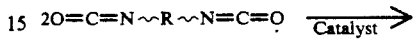

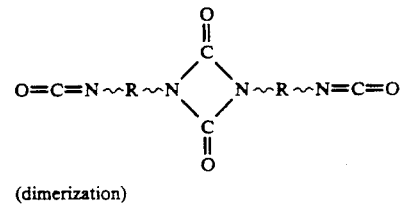

(dimerization)

the sealant composition of the present invention cures first on isocyanuration (and dimerization), at least in part, under the action of the catalyst, with the residual isocyanato groups being then caused to take part in the curing reaction by moisture.

The cured sealant of the invention has, at least in part, the above-mentioned isocyanurate structure. The isocyanurate structure and the dimer structure may be concurrently present.

The isocyanate prepolymer for use in the polyurethane sealant composition of the present invention is an isocyanato-terminated isocyanate prepolymer obtainable by reacting a polyol having a molecular weight of 2,000 to 20,000 with a stoichiometric excess of a bifunctional or trifunctional polyisocyanate compound. If the molecular weight of polyol is less than 2,000, the cured sealant composition does not show elasticity. If the molecular weight of the polyol is over than 20,000, the sealant composition shows less storage stability.

The polyol mentioned above may be any of polyols such as polyether polyols, polyester polyols, polycarbonate polyols and so on.

The polyisocyanate to be reacted with such polyol includes tolylene diisocyanate (TDI), diphenylmethane diisocyanate (MDI), 1,5-naphthalene diisocyanate (NDI), toluidine diisocyanate (TODI), hexamethylene diisocyanate (HDI), isophorone diisocyanate (IPDI), p-phenylene diisocyanate, trans-cyclohexane 1,4-diisocyanate, xylylene diisocyanate (XDI), hydrogenated XDI (H₆XDI), hydrogenated MDI (H₁₂MDI), lysine diisocyanate (LDI), triphenylmethane triisocyanate, monomeric triisocyanates such as tris(isocyanatophenyl)thiophosphate, tetra-methylxylene diisocyanate (TMXDI), lysine ester triisocyanate, 1,6,11-undecane triisocyanate, 1,8-diisocyanato-4-isocyanotomethyloctane and so on.

The isocyanurating catalyst to be employed in the present invention includes oxides such as Li₂O, (Bu₃Sn)₂O, R₃AsO, etc.; hydrides such as NaBH, R₃PbH, etc.; alkoxides such as NaOCH₃, KOtBu, borates, etc.; quaternary N, P, As, Sb and other hydroxides; amines such as N(C₂H₅)₃, N(CH₃)₂CH₂C₂H₅, N₂C₆H₁₂, etc.; and such combinations as amine/epoxide, amine/alcohol, amine/carboxylic acid, amine/alkylene carbonate, amine/alkyleneimide, amine/peroxide ammonium hydroxide/carbonate, tetraethylammonium iodide/phenyl glycidyl ether and so on. As typical commercial catalysts, there may be mentioned U-CAT SA and POLYCAT which are available from Sun-Apro Co., Ltd.

Such isocyanurating catalyst is used from 0.1 to 2 weight percent. If the amount of the catalyst is less than 0.1 weight %, the viscosity increase will be too small to be practically useful, while the use of the catalyst in excess of 2 weight % will result in gelation due to viscosity buildup on standing.

The urethane sealant composition of the present invention may further contain a variety of appropriate additives such as a coupling agent, tackifier, filler, thixotropic agent, stabilizer and so on.

The isocyanate prepolymer and the isocyanurating catalyst may have been previously admixed or may be admixed at the time of use. The sealant composition may also be provided as a two-package composition consisting of a mixture of said polyol and isocyanurating catalyst, and said isocyanate prepolymer.

In the manufacture of a sealant composition from said components, the curing temperature, cure time, cross-linking rate, etc. can be controlled according to the kind of isocyanate compound used, its molecular weight, the type and amount of isocyanurating catalyst, and use or non-use of a stabilizer.

These components are admixed in the conventional manner to provide a sealant composition. The sealant composition thus prepared is preferably stored at 5° to 30° C.

In using the sealant composition of the invention, the composition is first heated at 60°–160° C. for about 1 to 30 minutes and then applied to the substrate to be sealed. The sealant composition so applied undergoes rapid viscosity buildup due to isocyanuration under the action of the catalyst. Therefore, the sealant is less liable to flow (sag) or deform due to vibrations or the like. Moreover, initial bond strength is quickly attained to assist in workability. It should be understood that said heating may be performed after application to the substrate.

The sealant composition of the present invention is not cured by external moisture as the conventional one-package sealant composition. But, the sealant composition as in the two-package urethane sealant composition, undergoes internal curing due to heat and a catalyst, at least in part, with the resulting viscosity increase ensuring a useful degree of initial bond strength.

The following examples are intended to illustrate the invention in further detail.

EXAMPLE 1

| Component | Parts by weight |
| --- | --- |
| Isocyanate prepolymer L-1036 (Takeda Chemical Industries, Ltd.) | 40 |
| U-CAT SA-506 (isocyanurating catalyst, DBU-p-toluenesulfonate, manufactured by San-Apro Co., Ltd.) dissolved in plasticizer (5% w/w) | 20 |
| Plasticizer (DPO) | 10 |
| Carbon black | 30 |
| Total | 100 |

The above components were mixed in a dry nitrogen atmosphere under reduced pressure and the mixture was taken out and filled into a cartridge.

In application, the composition was heated at 120° C. for 30 minutes and directly applied.

EXAMPLE 2

| Component | Parts by weight |
| --- | --- |
| Isocyanate prepolymer L-1036 (Takeda Chemical Industries, Ltd.) | 40 |
| POLYCAT (isocyanurating catalyst, N,N',N''-tris(dimethylaminopropyl) hexahydro-s-triazine, manufactured by Sun-Apro Co., Ltd.) dissolved in plasticizer (5%, w/w | 20 |
| Plasticizer (DOP) | 9.7 |
| Carbon black | 30 |
| Diethyl malonate (stabilizer) | 0.3 |
| Total | 100 |

The above components were treated as in Example 1 to provide a sealant composition. In application, the composition was heated at 60° C. for 5 minutes and directly applied. The composition was stored at 20° C., 65% R.H.

EXAMPLE 3

| | Parts by weight |
| --- | --- |
| (Package A) | |
| Isocyanate prepolymer (Samprene SEL No. 3, manufactured by Sanyo Chemical Industries, Ltd.) | 40 |
| DOP | 10 |
| Calcium carbonate | 50 |
| Total | 100 |
| (Package B) | |
| POLYCAT (isocyanurating catalyst) | 2 |
| SK 500 (plasticizer) (Sanyo Chemical Industries, Ltd.) | 18 |
| Total | 20 |

The above two packages A and B were mixed in a mixer and the mixture was applied.

EXAMPLE 4

The procedure of Example 3 was repeated except that the prepolymer in Package A was replaced with Polybd HTP-5MLD (Idemitsu Petrochemical Co., Ltd.) to provide a two-package sealant composition.

COMPARATIVE EXAMPLE 1

| Component | Parts by weight |
| --- | --- |
| Isocyanate prepolymer L-1036 (Takeda Chemical Industries, Ltd.) | 40 |
| Plasticizer (DOP) | 29.5 |
| Carbon black | 30 |
| Lead octate (catalyst) | 0.5 |
| Total | 100 |

The above components were treated as in Example 1 to prepare a known moisture-curing sealant composition. This composition was heated at 120° C. for 30 minutes and directly applied.

The properties of the sealant compositions obtained in Examples 1 through 4 and in Comparative Example 1 were compared. The results are shown in Table 1.

Test Method

Coated plates (testpieces) cut to a width of 25 mm were respectively coated with an urethane primer #435-98 (Sunstar Engineering Inc.). Then, each of the above sealant compositions was applied and a testpiece similarly coated with the primer was pressed against it. The sealant was then caused to cure (20° C./65% R.H.). The lapping width of testpieces was 10 mm and the thickness of the sealant layer was 5 mm.

TABLE 1

|  | Shear strength (kg/cm$^2$) | |
| --- | --- | --- |
|  | 30 Min. | 72 Hrs. |
| Example 1 | 1.2 | 27 |
| Example 2 | 2.8 | 31 |
| Example 3 | 1.7 | 19 |
| Example 4 | 1.9 | 16 |
| Comparative Example 1 | 0.1 | 23 |

It will be apparent from the above results that the sealant composition of the present invention is particularly excellent in initial bond strength due to sharp viscosity buildup.

What is claimed is:

1. A moisture-curing sealant composition which comprises (a) an active isocyanato-terminated urethane prepolymer containing a polyol component with a molecular weight of 2,000 to 20,000 and (b) an isocyanurate catalyst, the sealant composition being able to cure first on isocyanuration, at least in part, under the action of the catalyst, with the residual isocyanato group being then caused to take part in the curing reaction by moisture.

2. A moisture-curing sealant composition claimed in claim 1, wherein the urethane prepolymer is an isocyanato-terminated urethane prepolymer obtainable by reacting a polyol having a molecular weight of 2,000 to 20,000 with a stoichiometric excess of a bifunctional or trifunctional polyisocyanate compound.

3. A moisture-curing sealant composition claimed in claim 2, wherein the polyol is at least one of the polyols selected from the group consisting of polyether polyols, polyester polyols and polycarbonate polyols.

4. A moisture-curing sealant composition claimed in claim 2, wherein polyisocyanate is tolylene diisocyanate, diphenylmethane diisocyanate, 1,5-naphthalene diisocyanate, toluidine diisocyanate, hexamethylene diisocyanate, isophorone diisocyanate, p-phenylene diisocyanate, trans-cyclohexane 1,4-diisocyanate, xylylene diisocyanate, hydrogenated XDI, hydrogenated MDI, lysine diisocyanate, triphenylmethane triisocyanate, tris(isocyanatophenyl) thiophosphate, tetramethylxylene diisocyanate, lysine ester triisocyanate, 1,6,11-undecane triisocyanate and 1,8-diisocyanato-4-isocyanato-methyloctane.

5. The moisture-curing sealant composition claimed in claim 1, wherein the isocyanurate catalyst is at least one of the catalysts selected from the group consisting of $N(C_2H_5)_3$, $N(CH_3)_2CH_2C_2H_5$, $N_2C_6H_{12}$, and combinations of amine/carboxylic acid, amine/alkylene carbonate, amine/alkyleneimide, amine/peroxide, ammonium hydroxide/carbonate, tetraethylammonium iodide/phenyl glycidyl ether.

6. A moisture-curing sealant composition claimed in claim 1, wherein the isocyanurate catalyst is used in an amount of from 0.1 to 2 weight percent.

7. A moisture-curing sealant composition claimed in claim 1, wherein the isocyanate prepolymer and the isocyanurate catalyst are previously admixed or are admixed at the time of use.

8. A moisture-curing sealant composition claimed in claim 1, wherein the sealant composition is provided as a two-package composition consisting of an admixture of said polyol and isocyanurate catalyst, and said urethane prepolymer.

* * * * *